United States Patent [19]

Henton et al.

[11] Patent Number: 5,491,194

[45] Date of Patent: Feb. 13, 1996

[54] THERMALLY PROCESSABLE BLENDS OF HIGH MODULUS POLYURETHANES AND MASS POLYMERIZED ABS RESINS

[75] Inventors: David E. Henton, Midland, Mich.; Augustin Chen, Cheshire, Conn.; Paul J. Moses, Midland, Mich.; Benjamin S. Ehrlich, League City, Tex.; Douglas E. Beyer, Midland, Mich.

[73] Assignee: The Dow Chemical Company, Midland, Mich.

[21] Appl. No.: 484,367

[22] Filed: Jun. 7, 1995

Related U.S. Application Data

[63] Continuation of Ser. No. 705,241, May 24, 1991, abandoned.

[51] Int. Cl.6 .............................. C08L 55/02; C08L 75/04
[52] U.S. Cl. ................................................. 525/66
[58] Field of Search ................................................. 525/66

[56] References Cited

U.S. PATENT DOCUMENTS

| 4,239,863 | 12/1980 | Bredeweg | 525/264 |
| 4,822,827 | 4/1989 | Bonk et al. | 521/170 |
| 4,874,815 | 10/1989 | Bubeck et al. | 525/85 |
| 5,055,525 | 10/1991 | Henton et al. | 525/66 |

OTHER PUBLICATIONS

"Polyblends," in *18 Kirk–Othmer Encyclopedia of Chemical Technology* 443–51 (3d ed., New York, John Wiley & Sons, 1982).

*Primary Examiner*—Thomas Hamilton, III

[57] ABSTRACT

The toughness of a thermoplastic, rigid polyurethane is markedly improved by incorporating a mass ABS resin such as styrene/butadiene rubber grafted with a copolymer of styrene and acrylonitrile. This toughened polyurethane is particularly useful in making structural automotive body parts and housings for electrical appliances.

8 Claims, No Drawings

THERMALLY PROCESSABLE BLENDS OF HIGH MODULUS POLYURETHANES AND MASS POLYMERIZED ABS RESINS

CROSS-REFERENCE TO RELATED APPLICATION

This is a continuation of application Ser. No. 07/705,241, filed May 24, 1991, now abandoned.

BACKGROUND OF THE INVENTION

This invention relates to synthetic polymeric resin compositions useful for thermoplastic fabrication and, more particularly to thermoplastic blends of extrudable and moldable urethane polymers and ABS resins.

Thermally processable polyurethanes having high modulus and good thermal properties are known to be useful in the manufacture of auto parts such as distributor covers as well as covers and containers for electronic circuitry. See, for example, U.S. Pat. 4,822,827. Typically, such polyurethanes can be produced by the reaction of a polyisocyanate with a cycloalkane polyol having a molecular weight in the range from about 60 to about 400.

Unfortunately, such polyurethanes do not exhibit the impact strength required for many applications. To increase impact strength of such polyurethanes, it has been a practice to incorporate minor amounts of impact modifiers such as high rubber content ABS resins, methyl methacrylate/butadiene/styrene terpolymers, chlorinated polyethylenes, ethylene/vinyl acetate copolymers as well as certain multi-phase composite polymers into such polyurethanes. Such practices have met with only limited success with the resultant blends exhibiting only moderately improved impact strength and often reduced stiffness. In addition, the resultant blends often do not exhibit sufficient processability to be readily extruded and molded into desired shapes.

In view of these deficiencies of the conventional high modulus, thermally processable polyurethanes, it is highly desirable to provide an impact modified polyurethane composition which exhibits improved toughness and stiffness and good thermal processability.

SUMMARY OF THE INVENTION

In a first aspect, the present invention is an impact-modified, thermally processable, high modulus polyurethane composition exhibiting resistance to solvents and sufficient thermal properties to withstand temperatures in excess of 80° C. This composition comprises (1) a thermally processable, rigid polyurethane as a continuous phase of the composition and (2) a mass-polymerized ABS resin in an amount sufficient to increase the notched Izod impact strength of the composition to a value that is greater than the same properties of a comparable blend of the polyurethane and an emulsion polymerized ABS resin. The mass-polymerized ABS resin is either dispersed in or co-continuous with the polyurethane.

Surprisingly, the polyurethane compositions of the present invention exhibit excellent solvent resistance and toughness (impact strength) and modulus (stiffness) greater than the toughness and stiffness of blends of the rigid polyurethane and a comparable emulsion-polymerized, high rubber ABS resin. For the purposes of this invention, comparable ABS resins are those resins having the same chemical constituency and the same weight ratio of rubber phase to non-rubber phase, but not necessarily the same structural parameters. For example, an emulsion-polymerized ABS resin having the same chemical constituency as a comparable mass ABS resin probably will not have the same rubber particle size or particle size distribution. As a result of their unique combination of properties, these polyurethane compositions are useful in automotive body parts, power tools, appliances, and other applications requiring good toughness and resistance to heat and solvents.

DETAILED DESCRIPTION OF ILLUSTRATIVE EMBODIMENTS

Polyurethane

The polyurethane employed in the practice of this invention is thermally processable, i.e., it exhibits the character of heat plastification upon heating to a temperature of 200° C. to 270° C. and can be extruded, injection molded or otherwise fabricated in the same manner as any other thermoplastic polymer. This polyurethane contains sufficient hard segment to impart a tensile modulus of at least 150,000 pounds per square inch (psi). Preferably the hard segment constitutes at least 90 weight percent of the polyurethane, most preferably at least 100 weight percent. Preferably, this hard segment has a glass transition temperature ($T_g$ as determined by ASTM D-746 -52T) of at least 60° C., more preferably at least 95° C., most preferably at least 115° C. Of particular interest are the polyurethanes prepared from an organic diisocyanate, a difunctional active hydrogen extender at least a part of which is a diol, diamine or comparable difunctional active hydrogen compound having a cycloalkanedialkylene or a cycloalkylene moiety (herein such difunctional active hydrogen compounds shall be collectively referred to as a cyclic diahl) and an optional polyahl which can have a functionality greater than 2. The term "ahl" means an active hydrogen moiety capable of reacting with an isocyanate group to form a urethane, urea, thiourea or corresponding linkage depending on the particular active hydrogen moiety being reacted. Examples of such preferred polyurethanes are the thermoplastic and similarly extrudable polyurethanes described in U.S. Pat. No. 4,822,827, which is hereby incorporated by reference in its entirety.

Organic diisocyanates which may be employed to make the polyurethane include aromatic, aliphatic and cycloaliphatic diisocyanates and combinations thereof. Representatives of these types are m-phenylene diisocyanate, tolylene-2,4-diisocyanate, tolylene-2,6 -diisocyanate, hexamethylene-1,6-diisocyanate, tetramethylene- 1,4-diisocyanate, cyclohexane-1,4-diisocyanate, diphenylmethane-4,4'-diisocyanate, 4,4'-biphenylene diisocyanate and other diisocyanates disclosed in U.S. Pat. No. 4,731,416. Due to their availability and properties, the aromatic diisocyanates such as tolylene diisocyanate, 4,4'-methyldiphenyl diisocyanate and polymethylene polyphenylisocyanate are preferred, with diphenylmethane-4,4'-diisocyanate and liquid forms based thereon being most preferred. Also suitable are isocyanate-terminated prepolymers such as those prepared by reacting polyisocyanates with polyols; however, the amount of polyol should be limited so that the Tg of the polyurethane is not reduced below 60° C.

The cyclic diahl is employed as a chain extender in an amount sufficient to impart the required $T_g$ for the hard segment. The cyclic diahl component may be a diahl or a mixture of more than one diahl. The cyclic ring may be substituted by inert groups in addition to the two active hydrogen moieties or alkylene active hydrogen moieties. By "inert group" is meant any group that does not react with an isocyanate group or active hydrogen group such as hydroxyl or amino or does not otherwise interfere the polyurethane or polyurea reaction. Examples of inert groups are $C_1$ to $C_8$ alkyls, nitro, $C_1$ to $C_8$ alkoxy, halo, cyano and the like. Illustrative cycloalkane diols include 1,3-cyclobutanediol, 1,3-cyclopentanediol, 1,2cyclohexanediol, 1,3-cyclohexanediol, 4,1-cyclohexanediol, 2-methyl-1,4-cyclohexanediol, 4,4'-methylene bis(cyclohexanol) and 4,4'-isopropylidenebis(cyclohexanol) and other cycloalkanediols listed in U.S. Pat. No. 4,822,827. Illustrative of the cycloalkane dialkanols include cyclohexane dimethanol. Of the cycloalkanediols and cycloalkane dialkanols (also called bis(hydroxyalkyl)cycloalkanes), the cyclohexanediols, cyclohexane dimethanol and 4,4'-alkylidenebis(cyclohexanols) are more preferred. Also suitable as cyclic diahls are the corresponding diamines, dithiols and diamides of cycloalkanes and dialkylcycloalkanes.

In addition to the cyclic diahls, other chain extenders are optionally employed in making the polyurethane provided that such chain extenders are used in amounts which do not reduce the glass transition temperature of the polyurethane below 60° C. Illustrative of such extenders are aliphatic straight and branched chain diols having from about 2 to 10 carbons in the chain, including, aliphatic diamines such as ethylenediamine and diethylenetriamine, and aromatic diamines such as diethyltoluenediamine. Exemplary diols, which are preferred as the other extender, include ethylene glycol, 1,3-propanediol, 1,4-butanediol, 1,5-pentanediol, 1,6-hexanediol, 1,2-propanediol, 1,3- and 2,3-butanediol, and mixtures of two or more of such diols as further described in U.S. Pat. No. 4,822,827. Trifunctional extenders such as glycerol, trimethylolpropane and the like can also be employed in small amounts i.e., less than 5 weight percent, in admixture with one or more of the aforementioned chain extenders. Larger amounts of the trifunctional extenders should be avoided in order to retain the desired thermal processability. Of the other extenders, it is more preferred to use 1,4-butanediol, 1,6-hexanediol, neopentyl glycol, ethylene glycol and diethylene glycol, either alone or in admixture with one or more of the named aliphatic diols. Most preferred of the other chain extenders are 1,4-butanediol, and 1,6-hexanediol.

The polyahl which is employed as the optional soft segment of the polyurethane includes any organic compound having at least two active hydrogen moieties wherein the compound has a molecular weight of at least 200 and a hydroxy equivalent weight of at least 50, preferably at least 100. Preferably, the polyahl is a polymer having at least two active hydrogen moieties, a molecular weight of at least 400 and a total of at least 5 monomeric units such as propylene oxide and ethylene oxide. For the purposes of this invention, an active hydrogen moiety refers to a moiety containing a hydrogen atom which, because of its position in the molecule, displays significant activity according to the Zerewitinoff test described by Woller in the *Journal of The American Chemical Society*, Vol. 49, p. 3181 (1927). Illustrative of such active hydrogen moieties are —COOH, —OH, —NH$_2$,=NH, —CONH$_2$, —SH and —CONH—. Typical polyahls are NCO-reactive and include polyols, polyamines including amine-terminated polyethers, polyamides, polymercaptans, hydroxy-terminated polyesters, polyacids and the like, particularly as exemplified in U.S. Pat. Nos. 4,394,491 and 4,822,827. In general the polyahl should not have a functionality greater than 4 in order to enable the polyurethane to retain its thermal processability. For the polyahls having a functionality of 3 or 4, the amount of polyahl employed should be relatively small, e.g., less than about 10 weight percent based on the polyahl, to avoid making a thermoset polyurethane.

Of the foregoing polyahls, the polyols are preferred. Examples of such polyols are the polyol polyethers, the polyol polyesters, hydroxy functional acrylic polymers, hydroxyl-containing epoxy resins, and other polyols described in U.S. Pat. No. 4,731,416, which is incorporated by reference in its entirety.

Polyether polyols which are most advantageously employed as the polyahl in the practice of this invention are the polyalkylene polyether polyols including the polymerization products of alkylene oxides and other oxiranes with water or polyhydric alcohols having from two to eight hydroxyl groups. Exemplary alcohols that are advantageously employed in making the polyether polyol include ethylene glycol, 1,3-propylene glycol, 1,2-propylene glycol, 1,4-butylene glycol, 1,3-butylene glycol, 1,2-butylene glycol, 1,5-pentane diol, 1,7-heptane diol, glycerol, 1,1,1-trimethylolpropane, 1,1,1-trimethylolethane, hexane-1,2,6-triol, α-methyl glucoside, pentaerythritol, erythritol, pentatols and hexatols. Also included within the term "polyhydric alcohol" are sugars such as glucose, sucrose, fructose and maltose as well as compounds derived from phenols such as 2,2-(4,4'-hydroxyphenyl)propane, commonly known as bisphenol A. Illustrative oxiranes that are advantageously employed in the preparation of the polyether polyol include simple alkylene oxides such as ethylene oxide, propylene oxide, butylene oxide, and amylene oxide; glycidyl ethers such as t-butyl glycidyl ether and phenyl glycidyl ether; and random or block copolymers of two or more of these oxiranes. The polyalkylene polyether polyols may have primary, secondary or tertiary hydroxyl groups and, preferably, are polyethers prepared from alkylene oxides having from two to six carbon atoms such as ethylene oxide, propylene oxide and butylene oxide. Polyether polyols which are most preferred include the alkylene oxide addition products of water, trimethylolpropane, glycerine, pentaerythritol, sucrose, sorbitol, propylene glycol and blends thereof having hydroxyl equivalent weights of from about 200 to about 10,000, especially from about 350 to about 3000.

In general, the overall proportions of the components of the polyurethane are such that the active hydrogen containing components, i.e., the chain extender(s) and the optional polyahl, balance the isocyanate component(s) so that stoichiometric equivalency of the reactants is maintained. However, for various reasons, it is not always possible or desirable to meet the 1:1 equivalency. Thus, the proportions are such that the overall ratio of isocyanate groups to active hydrogen groups is in the range from about 0.90:1 to about 1.15:1, and preferably, from about 0.95:1 to about 1.10:1. In the active hydrogen chain extender component, the cycloalkanediol and/or cycloalkane dialkanol portion is sufficient to provide the polyurethane with the desired $T_g$ which portion is preferably in the range from about 10 to about 100, more preferably from about 15 to about 100, most preferably 80–100, weight percent of total chain extender with the remainder being a conventional difunctional chain extender as previously discussed. The polyahl, which is optionally employed in the polyurethane, is employed in an amount which will not lower the tensile modulus of the polyurethane to values below 150,000 psi as measured in accordance with ASTM Test Method D-638. Preferably such amount is less than about 25 weight percent of the total weight of components used to make the polyurethane, with amounts less than 10 weight percent being more preferred.

Mass ABS Resin

The mass-polymerized ABS resin employed in the practice of this invention is a rubber-modified copolymer of a monovinylidene aromatic monomer and an ethylenically unsaturated nitrile, an ethylenically unsaturated ester or a mixture of the nitrile and ester wherein the resin is prepared by a mass or mass-suspension process. The resin comprises sufficient copolymer to constitute the continuous phase of the resin and sufficient rubber component to enable the resin to exhibit a notched Izod impact strength of at least 3 foot-pounds per inch of notch. Preferably the resin comprises from about 65 to about 95, most preferably from about 75 to about 90, weight percent of the copolymer and from about 5 to about 35, most preferably from 10 to about 25, weight percent of the rubber component usually in the form of discrete particles or domains.

The copolymer is suitably a random, block or graft copolymer or a combination thereof wherein the copolymer is a normally solid, hard (non-elastomeric) material having a glass transition temperature in excess of 25° C. The copolymer contains an amount of the monovinylidene aromatic monomer sufficient to provide the copolymer with a Tg above 25° C. and an amount of the nitrile and/or ester monomer sufficient to measurably increase the compatibility of the resin with the polyurethane. In addition the copolymer may contain other ethylenically unsaturated monomers typically employed in ABS resins. The copolymer preferably contains from about 55 to about 90, more preferably from about 57 to about 82, most preferably from about 60 to about 78, weight percent of the monovinylidene aromatic monomer; from about 10 to about 45, more preferably from about 18 to about 43, most preferably from about 22 to about 40, weight percent of the nitrile and/or ester monomer; and from about 0 to about 50 weight percent of another monomer.

Examples of suitable monovinylidene aromatic monomers include styrene; alkyl substituted styrenes such as α-methylstyrene, α-ethylstyrene, ar-methylstyrene, ar-(t-butyl)styrene and 2,4-dimethylstyrene; halostyrenes such as ar-chlorostyrene, 2,4-dichlorostyrene and ar-bromostyrene; styrenes substituted on the aromatic ring with other substituents such as cyano, alkoxy, alkoxycarbonyl, aryloxy and cycloalkyl. Of these monomers, styrene and alpha-methylstyrene are preferred. Examples of suitable nitrile and ester monomers include acrylonitrile, methacrylonitrile, fumaronitrile and ethacrylonitrile; lower alkyl (e.g., $C_1$–$C_6$ alkyl) esters of ethylenically unsaturated carboxylic acids such as ethyl acrylate, methyl methacrylate, butyl acrylate, 2-ethylhexyl acrylate and dimethyl maleate; and vinyl esters of saturated carboxylic acids such as vinyl acetate and vinyl proprionate. Of these nitrile and ester monomers, acrylonitrile and methyl methacrylate are preferred. Examples of suitable other monomers that are optionally employed in the copolymers are vinyl and vinylidene halides such as vinyl chloride, vinyl bromide and vinylidene chloride; ethylenically unsaturated ketones and ethers such as methyl vinyl ketone ethyl vinyl ether; 1-olefins such as ethylene, propylene and 1-butene; 1-hexene and 1-octene, with vinyl chloride being preferred. The copolymer preferably has a weight average molecular weight as determined by size exclusion chromatography in the range from about 20,000 to about 500,000 most preferably from about 50,000 to about 300,000.

The rubber component is a rubbery polymer having a glass transition temperature of 0° C. or lower, most preferably less than 20° C. The rubber component is dispersed in the aforementioned copolymer in the form of particles or domains which preferably have a volume average diameter from about 0.5 to about 5, more preferably from about 0.6 to about 3.5, most preferably from about 0.8 to about 3, micrometers. Examples of suitable rubbery polymers include homopolymers of 1,3-conjugated alkadiene monomers such as butadiene and isoprene; copolymers of from about 60 to about 99 weight percent of the alkadiene with from about 1 to about 40 weight percent of a monoethylenically unsaturated monomer such as styrene, acrylonitrile, methyl methacrylate or a mixture thereof; ethylene/propylene copolymer rubbers; acrylic rubber polymers prepared from acrylic monomers such as n-butyl acrylate, 2-ethylhexyl acrylate and ethyl acrylate; rubbery ethylene/propylene/non-conjugated diene copolymers; the other impact modifying polymers disclosed in U.S. Pat. No. 4,822,827; and mixtures of two or more of the aforementioned rubbers. Of these rubbery polymers, polymers containing from about 60 to 100 weight percent of 1,3-butadiene and from 0 to about 40 weight percent of styrene and/or methyl methacrylate and/or acrylonitrile are most preferred. Further it is preferred that the rubbery polymer be insoluble in the copolymer and in the polyurethane. The rubber is usually insoluble in the polyurethane and the copolymer as a result of prior crosslinking of the rubber.

A particularly preferred rubber component is a graft copolymer wherein the aforementioned rubbery polymer particles serve as substrates having grafted thereto a portion of the aforementioned non-rubbery copolymer as a superstrate. When this graft rubber polymer is used the ungrafted portion of the non-rubbery copolymer constitutes the continuous phase in which the rubbery graft copolymer particles are dispersed. Preferably, the graft rubbery copolymer will have a weight ratio of grafted superstrate to graftable rubber substrate ("G/R" ratio) in the range frown about 0.1:1 to about 1.8:1, most preferably from 0.2:1 to 1.5:1. In this graft rubbery copolymer, additional non-rubbery phase will often be occluded inside the rubber particles. This occluded non-rubber phase will increase the gel content and the "effective" rubber content of the resin. The resin, in such instances, preferably comprises a continuous phase of from about 37 to about 94.5, most preferably from about 62.5 to about 88, weight percent and a dispersed graft rubber and gel phase of from about 5.5 to about 63.0, most preferably from about 12 to about 37.5, weight percent.

The resin is suitably prepared by mass, mass/solution, mass/suspension polymerization techniques or combinations thereof such as illustrated in U.S. Pat. Nos. 4,239,863; 3,931,356; and 4,874,815 which are hereby incorporated by reference.

The mass polymerization is advantageously conducted in one or more substantially linear stratified flow or so-called plug-flow reactors such as described in U.S. Pat. No. 2,727,884 or in a stirred tank reactor wherein the contents of the reactor are essentially uniform throughout. The polymerization is advantageously conducted in an organic liquid reaction diluent such as aromatic or inertly substituted aromatic hydrocarbons such as benzene, toluene or ethylbenzene and in the presence of a free-radical initiator such as the peroxide initiators (e.g., dibenzoyl peroxide or 1,1-bis(t-butylperoxy) cyclohexane). In general, the initiator will be employed in an amount from 100 to 5000 weight parts per million weight parts of the monomers employed. The organic liquid reaction diluent is generally employed to control the viscosity of the polymerization mixture and is generally employed in an amount from 2 to 20 weight percent based on the total weight of the rubbery monomers and diluent. The polymerization mixture can further contain other adducts such as a plasticizer or lubricant such as mineral oil, an antioxidant such as bis(t-butyl)-p-cresol; a polymerization aid such as an alkyl mercaptan or a mold release agent such as zinc stearate. Temperatures at which polymerization is normally conducted are dependent on the specific components employed but will generally vary from 60° C. to 190° C.

The mass/suspension polymerization involves initially mass polymerizing the monomers/rubber mixture and, following phase inversion and subsequent size stabilization of the rubber particles, suspending the partially polymerized product in an aqueous medium which generally contains a polymerization initiator. Thereafter, the polymerization is completed using suspension polymerization techniques. Such mass/suspension polymerization procedures are further illustrated in U.S. Pat. Nos. 4,239,863 and 4,221,883.

The mass ABS resin is employed in the polyurethane in an amount sufficient to increase the notched impact strength of the polyurethane to a value which is greater than the notched impact strength for a comparable blend of the polyurethane and an emulsion-polymerized ABS resin. More preferably, the polyurethane composition of this invention comprises from about 35 to about 95 weight percent of the polyurethane and from about 5 to about 65 weight percent of the impact modifier, most preferably from about 45 to about 75 weight percent of the polyurethane and from about 25 to about 55 weight percent of the impact modifier. In addition to the foregoing critical components, this composition optionally contains other components such as other impact modifiers including emulsion-polymerized ABS, MBS and MBA resins, fillers and reinforcing fibers; and other common additives to plastic compositions such antioxidants, pigments and dyes, blowing agents, antistatic agents, UV absorbers and the like which do not interfere with the functions of the critical components.

The polyurethane compositions can be prepared by dispersing the mass ABS resin in either of the reactants used to prepare the polyurethane and then contacting the resultant dispersion with the other urethane reactants under conditions sufficient to form the polyurethane. See, for example, the conditions described in U.S. Pat. No. 4,822,827. Under such conditions, the reaction of isocyanate moieties and active hydrogen moieties can be carried out in absence of a urethane-type catalyst. However, when fast reaction time is desirable, e.g., less than one minute, the urethane reaction is carried out in the presence of a urethane-type catalyst which is effective to catalyze the reaction of the active hydrogen moieties with the isocyanate moieties. The urethane catalyst is used in an amount comparable to that used in conventional urethane-type reactions, preferably in an amount from about 0.001 to about 5 weight percent based on the weight of the reaction mixture. Any suitable urethane catalyst may be used including tertiary amines, such as, for example, triethylenediamine, N-methyl morpholine, N-ethyl morpholine, diethyl ethanolamine, N-coco morpholine, 1-methyl-4-dimethylaminoethyl piperazine, 3-methoxy-N-dimethylpropylamine, N,N-dimethyl-N',N' -methyl isopropyl propylenediamine, N,N-diethyl-3-diethylaminopropylamine, dimethylbenzylamine, and other catalysts disclosed in U.S. Pat. No. 4,731,416. Preferred catalysts are the tin catalysts such as the liquid organotin carboxylates, e.g., those catalysts prepared by the reaction on one mole of dialkyltin oxide with one mole of a carboxylic acid as disclosed in more detail in U.S. Pat. No. 3,661,887.

Alternatively, the mass ABS resin can be admixed, preferably in comminuted form such as powder, pellets and the like with the finished polyurethane also in a similarly comminuted form. The resulting physical mixture is then homogenized and/or fluxed by conventional melt blending means such as by extrusion, milling, Banbury mixing, and the like. When the polyurethane is prepared by a reactive extrusion method using a continuous twin screw reactor extruder such as described in U.S. Pat. No. 3,642,964, the mass ABS resin may be added in any conventional manner, e.g., initially with the urethane-forming reactants or at a later stage during polymer formation.

The polyurethane composition can be obtained in both cellular and non-cellular form. The cellular compositions, which may be classified as microcellular, can be prepared by methods well recognized in the art. For example, a blowing agent can be incorporated in the reaction mixture employed in the preparation of the compounds described above and subjected to foaming conditions such as those described in U.S. Pat. No. 4,822,827. The polyurethane compositions can be converted to non-cellular shapes by standard molding techniques known in the art of molding thermoplastic or thermoset polyurethanes. Such techniques include reaction injection molding and cast molding at the time the polyurethane is prepared and injection molding, extrusion, compression molding, blow molding calendering, thermoforming and the like in the case of fabricating the finished polymer composition. The marked resistance of the polyurethane component employed in the compositions of this invention to deformation or decomposition upon exposure to temperatures involved in melt processing greatly facilitates the fabrication of articles from the compositions.

Illustrative Embodiments

The following examples are given to illustrate the invention and should not be interpreted as limiting it in any way. Unless stated otherwise, all parts and percentages are given by weight.

EXAMPLE 1

A. Preparation of Mass ABS Resin

Using a continuous mass/solution polymerization process in the presence of a peroxide catalyst in a stirred tube, plug flow reactor, several mass ABS resins are prepared by polymerizing styrene and acrylonitrile in a solution of the monomers and a rubber in ethylbenzene. The other conditions of the polymerization are as generally described in U.S. Pat. No. 4,239,863. The monomer concentration and the type, particle size and concentration of rubber for each resin are reported in Table I. All of these resins are dried at 82° C. to less than 0.2 percent moisture before combining with the polyurethane.

B. Preparation of Core/Shell ABS Resin

An emulsion-polymerized, high rubber content, core/shell ABS resin is prepared by subjecting a reaction mixture of 52 parts of a monomeric mixture of 72% styrene and 28% acrylonitrile having dispersed therein 48 parts of a bimodal (0.8/0.1 micrometers) butadiene/styrene (93/7) copolymer latex to emulsion polymerization conditions. This high rubber, emulsion ABS resin, hereinafter designated as ABS-$C_1$, is recovered by freeze coagulation and dried at 82° C. to less than 0.02% moisture. An another emulsion-polymerized ABS resin (designated ABS-$C_2$) is similarly prepared except that the rubber content is reduced from 48 to 10 percent by blending ABS-$C_1$ with additional styrene/acrylonitrile copolymer. These emulsion ABS resins are also further described in Table I

TABLE I

| ABS Sample | Rubber Type[1] | Particle Size, μm[2] | Concentration[3] | % Acrylonitrile[4] |
|---|---|---|---|---|
| A | S/B Block | 0.9 | 20 | 23 |
| B | EPDM | 1.3 | 23 | 21 |
| C1 | Core/Shell | 0.1 & 0.8 | 48 | 15 |
| C2 | Core/Shell | 0.1 & 0.8 | 10 | 25 |
| D | Diene | 1.6 | 10 | 19 |

TABLE I-continued

| | | Rubber | | |
|---|---|---|---|---|
| ABS Sample | Type[1] | Particle Size, μm[2] | Concentration[3] | % Acrylonitrile[4] |
| E | Diene | 2.5 | 10 | 16 |
| F | Diene | 2.5 | 10 | 25 |
| G | Diene | 3.0 | 10 | 10 |
| H | Diene | 1.4 | 12 | 16 |
| I | S/B Block | 0.8 | 16 | 24 |
| J | Diene | 2.5 | 6 | 17 |
| L | Core/Shell | 0.1 | 55 | 13 |
| M | Diene | 2.6 | 8 | 17 |

[1]Rubber type wherein S/B block is a block copolymer of 25 weight percent styrene and 75 weight percent of butadiene; EDPM is a terpolymer rubber container, 52% ethylene, 39% propylene and 9% ethylidene norbornene; Core/Shell is a rubber latex as described in Part B. Diene is a 100% polybutadiene rubber.
[2]Volume average particle size in micrometers as determined by electron microscopy.
[3]% Rubber as a percent of total ABS weight.
[4]% Acrylonitrile as a percent of total ABS weight.

C. Preparation of Polyurethane

Into a 50 gallon kettle equipped with a stirrer, thermocouple, a nitrogen source and a vacuum valve is charged 100 parts of 1,4-cyclohexanedimethanol, 0.82 parts of tris-nonylphenylphosphite and 0.69 parts of a hindered phenol represented by the structural formula:

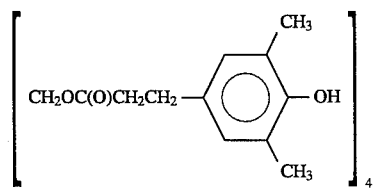

These ingredients are mixed and heated to 98.9° C. and dehydrated under vacuum for 2 hours. This diol mixture is supplied by a gear pump at the rate of 0.76 Kg/min. to the feed port of a twin-screw extruder preheated to about 232° C. Through a second gear pump is delivered 4,4'-methylenebis(phenylisocyanate)(MDI) into the same feed port of the extruder at the weight ratio 172.7 parts per 100 parts of the diol mixture. A third gear pump is used to deliver Formrez UL-22 (a dimethyltin dimercaptide urethane catalyst supplied by Witco Chemical) into the same feed port at the weight ratio of 0.17 parts for every 100 parts of diol mixture. The resulting mixed components react to form a polypurethane which is extruded onto a metal conveyor belt which is maintained at 21° C. This polyurethane is cooled, diced into pellets and dried in a dehumidifying hopper before further use.

D. Preparation and Testing of Blend Compositions

The polymeric components of Parts A and C are combined in the weight ratio of 65 parts of the polyurethane to 35 parts of the ABS resin by first tumble blending the dry pellets (0.94 cm×0.16 cm) of the components and then compounding them in a single pass through a Brabender twin screw extruder having a barrel temperature profile of 245° C. and operating at 15 rpm. The resulting blends in the form of pellets are redried at 115° C. and injection molded into test bars (21 cm×1.3 cm×0.32 cm) on an Arburg 220E (2 oz.) injection molding machine having a barrel temperature profile of 225° C., a nozzle temperature of 224° C. and a mold temperature of 100° C. and operating at a screw speed of 75 RPM, an injection speed setting of 3, an injection pressure of 850 psi and an injection time and cooling time of 10 and 25 seconds, respectively. Alternate similar results could be obtained by adding a pellet/pellet mixture of component parts A and C directly to the injection molding apparatus without previous compounding. The specimens are tested for physical properties and the results of such tests are reported in the following Table II.

E. Comparative Sample

For purposes of comparison, comparative samples are prepared using a mixtures of 65 parts of the polyurethane of Part C and 35 parts of one of the emulsion-polymerized ABS resins of Part B . These samples (Sample Nos. $C_1$–$C_2$) are also tested and the results of these tests are also reported in the Table II.

TABLE II

| | | Tensile Strength[2], psi (mPa) | | | |
|---|---|---|---|---|---|
| Sample No. | ABS Resin[1] Type | Yield | % Rubber in ABS | Impact[3] IZOD | DTUL[4], °F. (°C.) |
| 1 | ABS-A | 9260 (63.8) | 20 | 15.5 (827) | 255 (124) |
| $C_1$* | ABS-$C_1$ | 6880 (47.4) | 48 | 13.6 (726) | 238 (114) |
| 2 | ABS-D | 8450 (58.3) | 10 | 18.3 (977) | 252 (122) |
| $C_2$* | ABS-$C_2$ | 9730 (67.1) | 10 | 5.5 (294) | 247 (119) |
| 3 | ABS-B | 7910 (54.5) | 23 | 15.6 (833) | 252 (122) |

*Not an example of the invention
[1]Acronyms as previously defined in Table I
[2]Tensile Strength as determined by ASTM D-638
[3]Notched Izod in foot-pounds per inch of notch (J/M) as determined by ASTM D-256 at 73° F. using a 10 mil (0.025 cm) notch radius
[4]DTUL is a thermal distortion test measured at 66 psi on ½" (1.27 cm) × ⅛" (0.32 cm) unannealed bars as determined by ASTM D-648

As evidenced by the data shown in Table II, the blend compositions of the present invention Sample No.1, 2 and 3 exhibit improved tensile strength, heat resistance and similar impact strength as compared to the high rubber core/shell blend (Sample $C_1$) of the prior art. The composition of the present invention containing mass ABS also have significantly improved impact strength at lower levels of rubber than blends of core/shell ABS resins with similar compositions. (Compare Sample No. 2 with Sample No. $C_2$.)

EXAMPLE 2

Using ABS-E, ABS-F and ABS-G described in Table I and the polyurethane described in Part C of Example 1, three blends are prepared in the manner described in Part D of Example 1 and tested for tensile strength and impact strength. The results are reported in Table III.

TABLE III

| Sample No. | ABS Resin[1] Type | ABS Resin[1] % VCN | Tensile Strength[2], psi (mPa) Yield | Impact IZOD[3], ft-lb/inch (JM) | Dart[4] in-lb (J) |
|---|---|---|---|---|---|
| 4 | ABS-G | 10 | 7640 (52.7) | 7.6 (406) | 80 (9.0) |
| 5 | ABS-E | 16 | 8260 (57.0) | 7.7 (411) | 410 (46.3) |
| 6 | ABS-F | 25 | 8520 (58.7) | 7.9 (422) | 130 (14.7) |

[1-3]Same as 1-3 in Table II
[4]Dart impact as determined by ASTM D-3763-86 energy at peak load measured by instrumental dart impact at 73° F. (22.7° C.), 5280 inch (13411 cm)/minute, 0.5 inch (1.27 cm) diameter dart and 1.5 inch (3.8 cm) diameter support using test discs (5.08 cm × 0.32 cm)

The notched impact strength is only slightly affected by the % acrylonitrile level in the ABS, with higher levels of acrylonitrile being better. The dart impact strength improves significantly with higher % acrylonitrile.

EXAMPLE 3

ABS-D as described in Example 1 including Table I is combined with the polyurethane of Example 1, Part C using the blending procedure of Example 1, Part D. Several blend samples are prepared using the different proportions of the resin and polyurethane as described in Table IV. These samples are molded into test specimens and tested for tensile yield, dart impact strength and notched impact strength with the results of the tests also being reported in Table IV.

TABLE IV

| Sample No. | TPU/ABS[1] Weight Ratio | Tensile Strength[2], psi (mPa) Yield | Impact Strength Notched Izod[3] ft-lb/inch (J/M) | Dart[4] in-lbs (J) |
|---|---|---|---|---|
| 1 | 95/5 | 10630 (73.3) | 4.4 (235) | 185 (20.9) |
| 2 | 90/10 | 10330 (71.2) | 5.4 (288) | 275 (31.1) |
| 3 | 85/15 | 9740 (67.2) | 8.0 (427) | 283 (32.0) |
| 4 | 75/25 | 9040 (62.3) | 15.7 (838) | 504 (56.9) |
| 5 | 65/35 | 8250 (56.9) | 14.8 (790) | 462 (52.2) |
| 6 | 55/45 | 7660 (52.8) | 7.8 (416) | 412 (46.5) |
| 7 | 45/55 | 7170 (49.4) | 13.4 (715) | 405 (45.8) |
| 8 | 35/65 | 6660 (45.9) | 9.6 (512) | 240 (27.1) |
| 9 | 25/75 | 6570 (45.3) | 3.8 (203) | 110 (12.4) |
| 10 | 15/85 | 6060 (41.8) | 2.5 (133) | 80 (9.0) |
| C1* | 100/0 | 9660 (66.6) | 2.5 (133) | 360 (40.7) |
| C2* | 0/100 | 5540 (38.2) | 4.9 (262) | 240 (27.1) |

*Not an example of the invention
[1]ABS-D (See Table I)
[2-3]Same as in Table II
[4]Same as in Table III As evidenced by the data shown in Table IV, the blend compositions of the polyurethane and the mass ABS resin exhibit improved Izod and dart impact strengths when the proportion of the ABS resin is between about 5 to 65 weight percent compared to the Izod and dart impact strengths of the polyurethane and ABS components.

EXAMPLE 4

Several mass ABS resins are prepared by following the procedure of Example 1. Each resin is recovered as described in Example 1, Part A and combined with the polyurethane of Example 1, Part C using the blending procedure of Example 1, Part D and a ratio of 65 parts of the polyurethane to 35 parts of the resin. The resulting blend samples are molded into test specimens according to Example 1, Part D and tested for notched impact strength with the results of the tests also being reported in Table V. Two comparative blends (Sample Nos. C₁ and C₂) are similarly prepared and tested and the results are reported in Table V.

TABLE V

| Sample No. | ABS Resin[1] % Rubber | ABS Resin[1] Type | Impact Strength Notched Izod[3] ft-lb/inch (J/M) |
|---|---|---|---|
| 1 | 8 | ABS-M | 4.2 (224) |
| 2 | 10 | ABS-D | 14.8 (790) |
| 3 | 12 | ABS-H | 11.0 (587) |
| 4 | 16 | ABS-I | 11.9 (635) |
| 5 | 20 | ABS-A | 15.5 (827) |
| C1* | No ABS Resin | No ABS Resin | 2.5 (133) |
| C2* | 6 | ABS-J | 1.8 (96) |

*Not an example of the invention
[1]See Table I
[3]Same as 3 in Table II

As evidenced by the data shown in Table V, the blend compositions of the polyurethane and the different mass ABS resins exhibit increasing toughness with increasing rubber content. As further evidenced by comparing the impact strengths for the comparative blends, the use of an ABS resin with less than 8% rubber (Sample No. $C_2$) produces essentially no improvement in impact strength.

EXAMPLE 5

A mass ABS resin (ABS-M) and an emulsion-polymerized ABS resin (ABS-L) blended together in different proportions as described in Table IV with the polyurethane of Example 1, Part C. The resulting blend samples are molded into test specimens according to Example 1, Part D and tested for tensile yield and notched impact strength with the results of the tests also being reported in Table VI.

TABLE VI

| Sample No. | ABS Resin[1] Type | Ratio[2] | % Rubber | Tensile Yield[3], psi, (mPa) | Notched Izod[4] |
|---|---|---|---|---|---|
| 1 | ABS-M | 8.0 | 8 | 8550 (59.0) | 4.2 (224) |
| 2 | ABS-M/ABS-L | 7.2/5.5 | 12.7 | 7970 (55.0) | 10.6 (566) |
| 3 | ABS-M/ABS-L | 6.4/11.0 | 17.4 | 7560 (52.1) | 13.2 (705) |
| 4 | ABS-M/ABS-L | 5.6/16.5 | 22.1 | 7320 (50.5) | 14.3 (763) |

[1] See Table I
[2] Weight ratio of mass rubber to emulsion rubber in the ABS resin blend of the mass ABS resin (ABS-M) and the emulsion-polymerized ABS resin (ABS-L)
[3] Tensile Strength as determined by ASTM D-638
[4] Notched Izod in foot-pounds per inch of notch (J/M) as determined by ASTM D-256 at 73° F. using a 10 mil (0.025 cm) notch radius As evidenced by the data shown in Table VI, the addition of emulsion-polymerized ABS resin to a mass ABS resin having a moderately low level of rubber provides further enhancement of impact strength when the combination is incorporated into the polyurethane.

What is claimed is:

1. A thermally processable, polyurethane composition comprising from about 35 to about 90 weight percent of a thermally processable, rigid polyurethane and from about 65 to 10 weight percent of a mass ABS either dispersed in or co-continuous with the polyurethane, said mass ABS resin being comprised of from about 5 to about 35 weight percent rubber and from about 95 to about 65 weight percent of a copolymer of acrylonitrile and styrene.

2. The composition of claim 1 wherein the polyurethane consists essentially of the reaction product of diphenylmethane-4,4'-diisocyanate or a liquid polymer of diphenylmethane-4,4'-diisocyanate and cyclohexanedimethanol, cyclohexanediol or a mixture thereof.

3. The composition of claim 1 comprising from about 45 to about 75 weight percent of the polyurethane and from about 25 to about 55 weight percent of the mass ABS resin.

4. The composition of claim 3 wherein the polyurethane has a glass transition temperature greater than 115° C.

5. The composition of claim 4 wherein the mass ABS resin contains from about 10 to about 25 weight percent of rubber and from about 90 to about 75 weight percent of a copolymer of from about 22 to about 40 weight percent of acrylonitrile and from about 60 to about 78 weight percent of styrene.

6. A thermally processable, polyurethane composition comprising from about 65 to about 35 weight percent of a thermally processable, rigid polyurethane consisting essentially of the reaction product of an organic diisocyanate and a cyclic diahl wherein at least 50 weight percent of the cyclic diahl is cyclohexane dimethanol and from about 35 to about 65 weight percent of a mass polymerized ABS resin being either dispersed in or co-continuous with the polyurethane.

7. The composition of claim 6 comprising from about 35 to about 85 weight percent of the thermoplastic polyurethane and from about 65 to 15 weight percent of the mass ABS resin.

8. The composition of claim 7 wherein the polyurethane has a glass transition temperature greater than 95° C.

* * * * *